G. R. Bramhall,
Pier.
No. 78,860. Patented June 16, 1868.
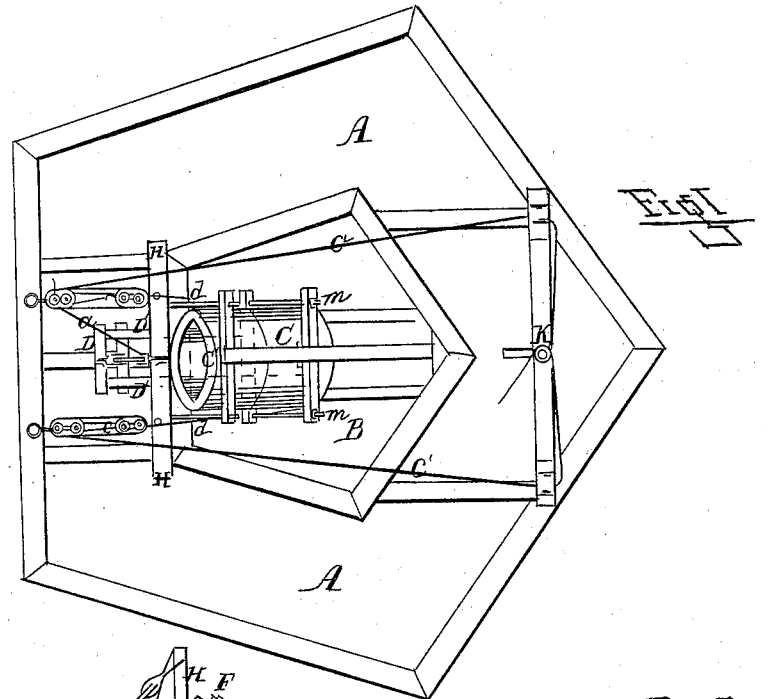
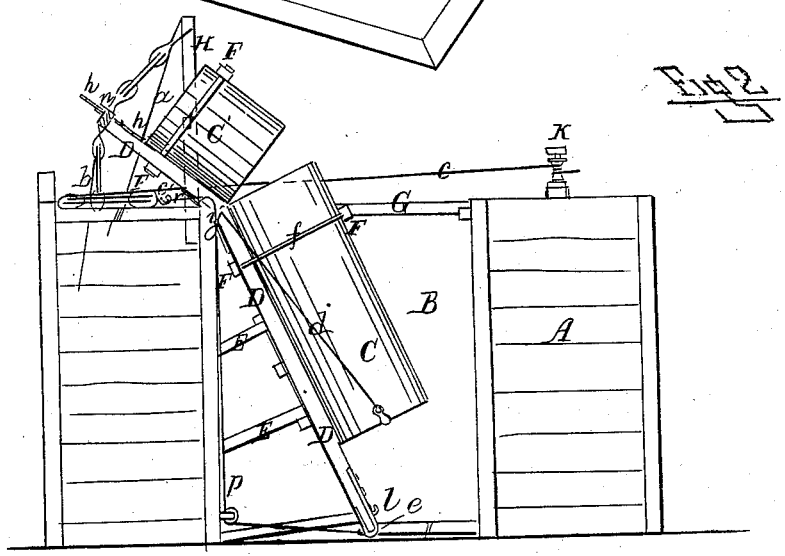
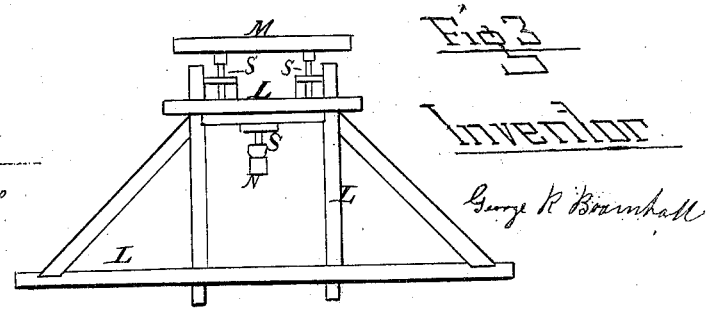
Witnesses
W. E. Mann
L. L. Cleburn
Inventor
George R. Bramhall

United States Patent Office.

GEORGE R. BRAMHALL, OF CHICAGO, ILLINOIS.

Letters Patent No. 78,860, dated June 16, 1868.

---

IMPROVED METHOD OF LOWERING CYLINDERS.

---

The Schedule referred to in these Letters Patent and making part of the same.

---

TO ALL WHOM IT MAY CONCERN:

Be it known that I, GEORGE R. BRAMHALL, of Chicago, in the county of Cook, and State of Illinois, have invented a new and useful Improved Apparatus for Lowering or Sinking Cylinders and other heavy weights; and I do hereby declare and make known that the following is a full, clear, and exact description of the same, reference being had to the accompanying drawings, and the letters and figures marked thereon, which form part of this specification.

My said invention has particular reference to a machine for lowering and sinking beneath the water sections of a tube or cylinder, where said sections are to be secured and bolted together, so as to form a cylinder or well, it being necessary to secure the heavy sections together above the water, and gradually lower the lower portion of the cylinder into the water as the successive sections thereof are attached to the top, as hereinafter more fully described.

To enable those skilled in the art to make and use my said invention, I will proceed to describe the same with particularity, making reference in so doing to the aforesaid drawings, in which—

Figure 1 represents a plan or top view of my invention.

Figure 2 is a vertical central section of the same, and

Figure 3 is a side view of a device to be placed over the cylinder, to enable the same to be raised up or pressed down into the soil, as desired.

Similar letters of reference in the several figures denote the same parts of my said invention.

A represents a crib, constructed in the manner of a coffer-dam, enclosing a well-hole, B, which is filled with water.

C represents a cylinder in the process of being lowered, C' being a section thereof, which is to be placed upon the upper end of the cylinder C, and secured thereto, as hereinafter specified.

D represents an inclined way or slide, upon which the cylinder moves and rests during the operation, to the upper end of which way D is hinged a prolongation thereof, marked D', which may be lowered parallel with the surface of the crib, or may be raised up, so as to lie in the same inclination with D, forming a continuation thereof in a right line, said movement being effected by means of ropes and tackling, as indicated, as by loosening the cord $a$ and drawing upon the cord $b$ the platform D' is lowered, and by loosening $b$ and drawing upon $a$ it is raised, the tackling of the rope $a$ being attached to a cross-bar upon the uprights H H, as shown in the drawings.

In operating my invention, the platform D' is lowered parallel to the crib-floor or top, and one of the sections of the cylinder is placed thereon, and a clamp, F and $f$, is arranged, securely binding said section to the platform, which is then raised up, to allow said section to slide down, hooks and links $h$ being attached to its upper end, and passing through a head-block upon the end of the platform, where it is secured by a nut, $n$, as seen in fig. 2.

A cord or chain or chains, $d$, are secured to the lower end of the section, and to the tackling of the cords or chains $c$, which pass back to a capstan, as seen in fig. 2.

When the platform is raised up in a line with the ways D, the weight of the cylinder or section is allowed to come upon the chains $d$ and the hooked rod $h$, when the clamp F is loosened slightly, and the section is permitted to slide down upon the ways D until the upper end of the section lies about two or three feet below the joint connecting the way D and the platform D', for the purposes hereinafter set forth and described, in which position said section is clamped to the ways D by a similar clamp to that used in securing it to the platform.

The platform is again lowered, and another section of the tube or cylinder is placed and secured thereon, when the platform is raised partly up, and the upper section is allowed to slide down as before, balancing over the hinged point until its lower end should have reached that position, so that the raising of the platform in a line with the ways will cause the lower end of the upper section to rest squarely upon the lower section, which lies above the surface of the water, where the two sections are firmly bolted together, when the whole are lowered as before, by the means aforesaid, until the upper end of the top sections passes the proper distance below the joint $g$, before mentioned, when the clamp is tightened, and the chains $c$ held firmly upon the capstan.

The nut $n$ upon the rods $h$ is turned, to permit the section to descend until the end thereof rests upon the top of the lower section, forming a support at the same time.

The above-described operation is continued until all the sections are lowered and secured together, when the lower end rests upon a hook or support, $l$, represented in fig. 2.

After the lowering of the cylinder is completed, the hinge $g$ is removed, separating the ways D from the platform, the brace $d$ is removed, and the ways are swung up upon its hinge $e$, which connects their foot with the frame I, bringing the cylinder into a vertical position, its lower end resting upon the step $l$, the braces E, in the mean time, detaching themselves, and floating up to the surface.

In fig. 3 is shown a frame, which is then placed over the cylinder, resting upon the crib, so that by attaching a chain to the cylinder, and also to the cross-bar M, which is supported upon jack-screws $s$, which rest upon the top plate L of the frame, the cylinder can be raised up by the turning of the screws, when, by drawing upon the cord or chain $p$, shown in fig. 2, the ways and the frame I beneath the cylinder are withdrawn, when the cylinder is allowed to settle down upon the clay or bottom of the lake or stream.

By clamping said frame L to the crib in any suitable manner, and blocking up between the top of the cylinder and the follower or bar N, the turning of the screws above said bar N will force or drive the cylinder into the clay or soil beneath, if desired.

Having described the construction and operation of my invention, I will specify what I claim, and desire to secure by Letters Patent.

1. I claim the combination and arrangement of the inclined way D, hinged at the bottom, as shown, and the hinged adjustable platform D′, with its means of elevation and depression, substantially in the manner and for the purposes specified.

2. I claim, in combination with the above, the clamps F $f$, operating in the manner and for the purposes set forth.

3. In combination with the hinged platform D′ and ways D, I claim the linked rods $h$, arranged to operate as and for the purposes described.

4. I claim the frame L, with its movable bars M N, in combination with the ways D and frame I, arranged in the manner and for the purposes described.

GEORGE R. BRAMHALL.

Witnesses:
W. E. MARRS,
L. L. COBURN.